April 2, 1957  C. A. LAVERY  2,787,451
GLYCOL TOWER SEPARATOR
Filed July 20, 1954
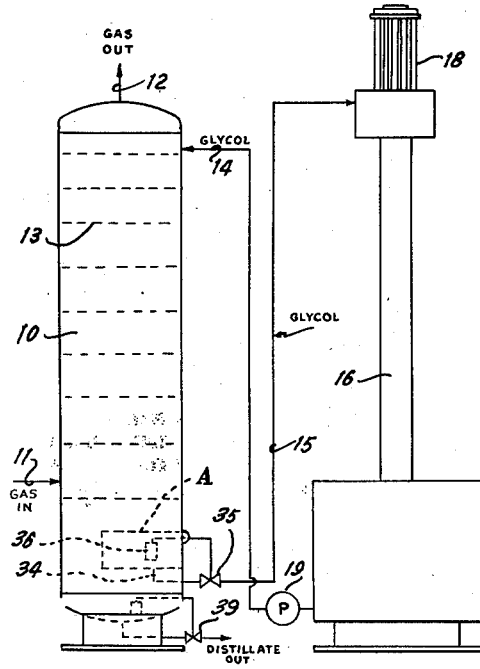
Fig. 1
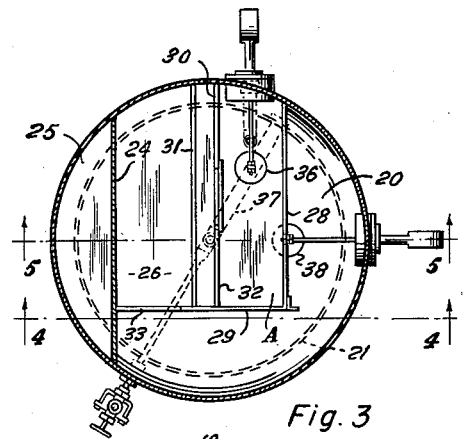
Fig. 3
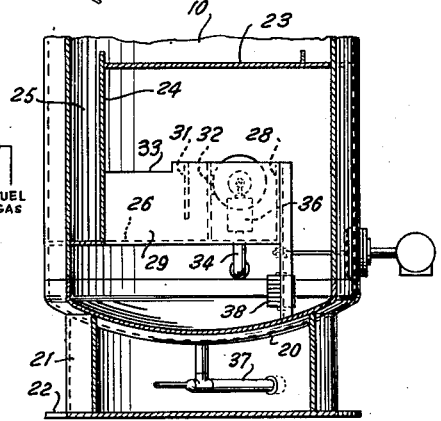
Fig. 4
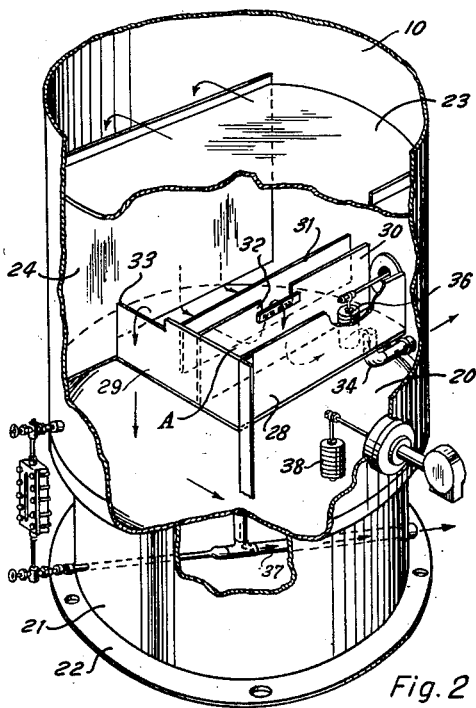
Fig. 2
Fig. 5
INVENTOR
Charles A. Lavery
BY Ashley & Ashley
ATTORNEYS

United States Patent Office 2,787,451
Patented Apr. 2, 1957

2,787,451

GLYCOL TOWER SEPARATOR

Charles A. Lavery, Tulsa, Okla., assignor to National Tank Company, Tulsa, Okla., a corporation of Nevada Application July 20, 1954, Serial No. 444,523

4 Claims. (Cl. 261—3)

This invention relates to new and useful improvements in the separation of liquid phases in gas contactor towers.

It is often necessary or desirable to subject a gas stream, such as a stream of natural gas flowing from a petroleum well, to intimate contact with a treating liquid in order to remove from the gas stream certain constituents. Thus, it is customary to process natural gas streams for the removal of hydrogen sulphide therefrom, or, more often, to reduce the water vapor content thereof to facilitate subsequent handling and transmission of the natural gas through pipe lines.

Natural gas streams often contain quantities of readily liquifiable hydrocarbons, and in the course of treating the gas stream with a treating liquid, quantities of these hydrocarbons may be condensed or liquified, and will settle out of the gas stream along with the treating liquid. In most cases, the treating liquid is recovered for reconcentrating or other form of reactivation, and is subsequently recirculated to the contacting vessel or tower. The accumulation of quantities of liquid hydrocarbons in the treating liquid circulating system impairs the operation of the system, and sometimes introduces severe hazards.

While the invention is applicable to many types of processes, it will be described primarily with respect to the dehydration of natural gas by an aqueous glycol solution, such as a water solution of diethylene glycol or triethylene glycol. In such a system, the gas stream is passed through a contactor tower countercurrently to the concentrated glycol solution, the latter flowing to and accumulating in the bottom of the tower and being removed therefrom for reconcentration in a heating unit wherein excess water is driven off from the diluted glycol solution to reconstitute a concentrated glycol solution that may again be circulated to the contactor tower. A quantity of the glycol solution is normally carried in inventory in the bottom of the contactor tower, and withdrawn for reconcentration as further quantities thereof accumulate, such action normally being carried out by means of a suitable float control positioned in the bottom of the tower.

As liquid hydrocarbons accumulate in the bottom of the tower due to their condensation and separation from the gas stream, false indications are given to the float control mechanism of the quantity of glycol present, and hence, the dilute glycol solution may be passed to the reconcentrator unit at an excessive rate. Further, the continued accumulation of liquid hydrocarbons will ultimately result in the passage of liquid hydrocarbons or distillate to the reconcentrator, the subjection of such distillate to heating and vaporization, and the consequent creation of a severe fire or explosion hazard. Further, in those cases where sufficient quantities of distillate are separated as to warrant recovery and sale, such operation results in the loss by vaporization of a valuable and marketable commodity.

It is, therefore, the principal object of this invention to provide a structure for a gas contactor vessel having means for separating therein two bodies of immiscible liquids and the separate withdrawal of such liquids.

A further object of the invention is to provide a system of the character described in which an inflammable liquid is prevented from passage into a heating zone so as to avoid the creation of a fire or explosion hazard.

Yet another object of the invention is to provide a structure of the character described having means for separately and automatically withdrawing from the contactor vessel two immiscible liquids at rates in accordance with the rate of accumulation of such liquids.

As a further consideration, it is sometimes quite expensive to place a gas treatment system of this type in operation in that relatively large quantities of a treating liquid such as triethylene glycol must be placed in the system in order to provide the desired treating liquid operating level in the bottom of the contactor vessel. The sump in the bottom of a six foot contactor tower may contain approximately eight barrels of treating liquid in order to maintain the proper or necessary or liquid level therein. In the present invention, the major portion of this sump is occupied by distillate, and only a relatively small space is required to be full constantly of the treating liquid such as a glycol. In this manner, a considerable saving in the initial charge of treating liquid to the system may be effected, and it is an additional object of the invention to provide an improved system of the character described in which such saving in treating liquid inventory may be realized.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a schematic view of a glycol-desiccant natural gas dehydrating structure constructed in accordance with this invention, Fig. 2 is a perspective view of the lower portion of the gas contactor tower, portions of the structure being broken away for purposes of illustration, Fig. 3 is a horizontal, cross-sectional view taken through the lower portion of the contactor tower immediately above the liquid separation structure and, Figs. 4 and 5 are vertical, sectional views of the lower portion of the contactor tower, the views being taken upon the respective lines of Fig. 3.

In the drawings, the numeral 10 designates a vertical gas contactor tower having a gas inlet 11 near its lower end and a gas outlet 12 at its upper end. The internal structure of the tower may vary considerably and will include suitable means for effecting intimate and efficient contact between the upwardly moving gas stream and a downwardly moving stream of treating liquid. Such means may consist of perforated trays, various types of tower packing or other suitable structure indicated in general at 13 in Fig. 1 by the transverse dotted lines.

The treating liquid, as for instance a glycol, enters the tower at the upper end at 14, and is removed from the tower as a dilute aqueous solution through the outlet pipe or line 15 extending from the bottom portion of the tower. This dilute treating liquid is conveyed through the pipe 15 into a reconcentrator unit 16 in which it is subjected to the heating action of a heater 17 whereby excess water is driven off through the stack or column 18. The reconcentrated treating liquid is then ready for further use and is recirculated from the reconcentrator unit 16 through a pump 19 to the treating liquid inlet 14.

In the course of the countercurrent flow of the gas stream and the treating liquid, certain selected constituents are removed from the gas stream, concentrated in the treating liquid, and subsequently removed from the treating liquid in the reconcentrator unit 16. In the case of a dehydrating unit, water or water vapor is removed from the natural gas stream by a glycol solution due to the low water vapor pressure exhibited by the concentrated glycol entering through the line 14. At the same time, however, some cooling of the gas stream may have occured in its passage from the producing well to the tower 10, or in the tower 10, there may be some condensing or separating effect contributed by the passage of the treating liquid through the tower countercurrent to the gas stream, or in other manners liquifaction of hydrocarbons, such as distillate, will result in the accumulation of the lower portion of the tower 10 of sizable quantities of distillate. Thus, the tower 10 normally operates with a stream of natural gas moving upwardly therein and a commingled stream of distillate and treating liquid moving downwardly therein to accumulate in the bottom of the tower.

The lower portion of the tower is shown in more detail in Fig. 2 of the drawings wherein there is illustrated a particular embodiment of this invention with indication of the paths of flow of the two immiscible liquids, distillate and glycol, in the course of their separate discharge from the tower 10.

Referring now to Fig. 2, it will be seen that the tower 10 has its lower end closed by a dished bottom 20 carried upon a suitable supporting ring or collar 21 and bottom plate 22 by means of which the tower may be secured upon a foundation or other support. A partition 23 extends transversely of the tower below the lowermost tray or other contacting means 13, the partition 23 terminating short of one wall of the tower and adjoining a vertical plate 24 extending downwardly in the tower from the partition 23 toward the dished bottom 20 and defining with one wall of the tower a vertical flume 25 into which the commingled liquids spill from the partition 23.

The lower end of the plate 24 adjoins a second partition 26 extending transversely across the tower 10 a short distance above the bottom 20 thereof and has an elongate horizontal section cut from its lower edge to form a horizontal slot 27 between the lower edge of the plate 24 and the upper surface of the partition 26, and through which liquids may flow from the flume 25 onto the upper surface of the plate 26.

Spaced from the slot 27 and projecting upwardly from the plate 26 parallel to the slot 27 is a side wall plate 28 for confining liquids on the upper surface of the partition 26. One end of the plate 28 is joined to the wall of the tank 10, and an end or weir plate 29 extends from the outer end of the plate 28 to the plate 24 adjacent the end of the slot 27.

A weir or partition 30 extends transversely of the space enclosed by the walls 28 and 29 and has its lower edge joined to the partition 26. The partition 30 extends substantially parallel to the slot 27, and a baffle 31 is disposed transversely of the structure between the plate 24 and the partition 30 with its upper edge substantially in a plane with the upper edge of the partition 30 and the walls 28 and 29. As shown in Fig. 5, the lower edge of the baffle 31 is spaced above the upper surface of the partition 26, and hence, liquids may flow under the baffle 31, through the notch weir 32 provided in the upper edge of the partition 30, and into the treating liquid sump A enclosed between the wall 28 and the partition 30.

The immiscible liquids flowing from the flume 25 and through the slot 27 into the space or compartment enclosed between the plate 24 and the partition 30, will be of different gravities and will promptly stratify into upper and lower layers. In the case of the dehydration of natural gas by a glycol solution, the distillate phase, being lighter, will constitute the upper layer, while the glycol desiccant will stratify into a lower layer. As previously pointed out, the glycol solution will flow from this lower layer, under the baffle 31, and through the weir notch 32 of the partition 30 and into the sump A enclosed between the partition 30 and the wall 28. For skimming off the upper layer of distillate in accordance with the rate at which the distillate accumulates, the wall 29 has a weir notch 33 cut in its upper edge between the points at which the wall 29 joins the plate 24 and the baffle 31. Thus, the upper layer of distillate flows through the notch 33 onto the bottom 20 of the tower 10 and accumulates in the portion of the tower below the partition 26 which constitutes a second sump B. A suitable drain 34 extends through the wall of the tower 10 from the bottom of the heavy liquid sump A, and discharge therethrough is controlled by a valve 35 actuated by a float 36 disposed within the sump A. Thus, the glycol or treating liquid is discharged from the sump A at the same rate at which it accumulates therein, and is driven by the pressure in the tower 10 through the conductor 15 to the reconcentrator 16.

The distillate or other liquid accumulating in the light liquid sump B above the bottom 20 of the tower 10 is discharged through a drain conductor 37 opening from the bottom 20 through the support ring 21. Discharge of liquid through this drain may be manually controlled, or in the event distillate or other liquid accumulates in appreciable and regular quantities, discharge of the liquid may be effected through a valve 39 connected into the discharge from the drain and controlled by a float 38 positioned within the sump B adjacent the bottom thereof.

In the operation of the device, as the commingled immiscible liquids pass downwardly through the flume 25 and by way of the slot 27 into the stratifying or phase separating structure which has been described, the glycol or heavier liquid is constantly taken off separately into the sump A at a rate equal to its rate of entry, and the distillate or lighter liquid is skimmed off into the lowermost portion of the tower into the sump B for separate discharge. In this manner, contamination of the treating liquid with the distillate is avoided and only the treating liquid, such as glycol, is permitted to pass to the reconcentrator unit 16. The distillate is separated and separately discharged for disposal, sale, or other use.

It is to be noted that no large volume of treating liquid is held in the lower portion of the contactor tower 10, and hence, the initial inventory of such liquid is held to a minimum. Instead of the entire lower portion of the tower 10 being filled with the treating liquid, only the sump A must be filled to operating level or a height sufficient to actuate the float 36. In the case of treating liquids which are relatively expensive and may cost as much as several dollars per gallon, a quite considerable saving in initial treating liquid inventory is thus realized, especially in those cases where the tower 10 is of a diameter of several feet.

The structure and system herein disclosed is not limited to a glycol and natural gas contactor for the purpose of dehydration. It can also be used quite readily, for instance, in a desorber for the purpose of separating distillate, or product as it may be termed, in the desorber from the injected dehydration media such as a glycol or other chemical desiccants, in which case, the glycol would be the element withdrawn for reuse in the system of injection while the distillate would be withdrawn through a separate outlet and discharged into storage vessels for sale. In this case, the distillate would be the major portion of the liquid by many times. Other immiscible liquids could easily be withdrawn using this same system; whether they are withdrawn as contaminates or withdrawn as usable sidestreams would make little difference.

There are at present stabilizing systems in use which utilize the injection of glycol or a desiccant ahead of a cold separation system, followed by the discharge of the desiccant and the distillate product together into a stabilizer tower. It is then necessary to discharge the desiccant and distillate through a separation vessel and possibly apply heat at that point to effect separation before the distillate can be sent to storage and the desiccant withdrawn for further use. The use of the present invention makes it possible to eliminate this secondary vessel and to eliminate largely any emulsions caused by the simultaneous discharge of the desiccant and distillate through a small diameter valve or orifice. The system is applicable to any type of tower wherein two immiscible liquids are present and it is desired to effect a separation between these phases with separate discharge thereof from the tower.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A gas contactor tower for contacting a gas stream with a treating liquid including, a tower shell having a gas stream inlet and outlet, a treating liquid inlet to the tower spaced above the lower end thereof, a liquid receiving partition in the lower portion of the tower, liquid conducting means extending downwardly in the tower from the partition, a stratification chamber in the tower at the lower end of the conducting means, a light liquid discharge from the top of the chamber, a heavy liquid discharge from the bottom of the chamber, the tower having sumps therein into which the light and heavy liquids are discharged from the chamber, outlet conductors from said sumps, float controlled valves in said outlet conductors, and surface floats in said sumps for controlling said valves.

2. A gas contactor tower for contacting a gas stream with a treating liquid including, a tower shell having a gas stream inlet and outlet, a treating liquid inlet to the tower spaced above the lower end thereof, a liquid receiving partition in the lower portion of the tower, liquid conducting means extending downwardly in the tower from the partition, a liquid stratifying chamber in the tower at the lower end of the conducting means, a heavy liquid accumulation sump, a U-tube discharge between the heavy liquid sump and the lower portion of the stratifying chamber, a light liquid sump, a weir discharge between the light liquid sump and the stratifying chamber above the U-tube discharge, liquid outlet conductors from both sumps, float controlled valves in said outlet conductors, and surface floats in said sumps for controlling said valves.

3. A gas contactor tower as set forth in claim 1 wherein the liquid conducting means is a flume, a vertical plate in the tower spaced from one wall of the tower and forming said flume with said wall, the flume opening into the stratification chamber at the bottom thereof.

4. In a tower having a gas inlet and a gas outlet and means for admitting immiscible fluids of differing gravities, a liquid receiving partition in the lower portion of the tower, a liquid conducting means extending downwardly in the tower from the partition, a stratification chamber in the tower at the lower end of the conducting means, a light liquid discharge from the top of the chamber, a heavy liquid discharge from the bottom of the chamber, the tower having sumps therein into which the light and heavy liquids are discharged from the chamber, outlet conductors from said sumps, float controlled valves in said outlet conductors, and surface floats in said sumps for controlling said valves.

References Cited in the file of this patent

UNITED STATES PATENTS

| | | |
|---|---|---|
| 911,314 | Maranville | Feb. 2, 1909 |
| 1,284,245 | Coleman et al. | Nov. 12, 1918 |
| 1,612,557 | Weisgerber | Dec. 28, 1926 |
| 1,672,583 | Travers | June 5, 1928 |
| 1,873,597 | Jones | Aug. 23, 1932 |
| 2,058,044 | Spencer | Oct. 20, 1936 |
| 2,117,273 | Brown | May 17, 1938 |
| 2,151,248 | Vaughan | Mar. 21, 1939 |
| 2,198,142 | Wade | Apr. 23, 1940 |
| 2,214,678 | Raigorodsky | Sept. 10, 1940 |
| 2,342,165 | Plummer | Feb. 22, 1944 |
| 2,614,649 | Walker et al. | Oct. 21, 1952 |
| 2,715,948 | Lewis et al. | Aug. 23, 1955 |